United States Patent
Ninomiya et al.

(10) Patent No.: US 7,116,610 B2
(45) Date of Patent: Oct. 3, 2006

(54) OPTICAL DISK DEVICE AND TILT CORRECTION METHOD

(75) Inventors: Masaki Ninomiya, Kanagawa (JP); Takehide Ohno, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 597 days.

(21) Appl. No.: 10/647,502

(22) Filed: Aug. 26, 2003

(65) Prior Publication Data
US 2004/0100894 A1    May 27, 2004

(30) Foreign Application Priority Data
Aug. 30, 2002 (JP) ............... 2002-253738

(51) Int. Cl.
G11B 7/00 (2006.01)
(52) U.S. Cl. ............... 369/44.32; 369/53.19; 369/44.28
(58) Field of Classification Search ............... None
See application file for complete search history.

(56) References Cited
U.S. PATENT DOCUMENTS

| | | |
|---|---|---|
| 5,128,806 A | 7/1992 | Ohno |
| 5,140,572 A | 8/1992 | Kibune et al. |
| 5,303,089 A | 4/1994 | Ohno |
| 5,351,221 A | 9/1994 | Ohno |
| 5,777,960 A | 7/1998 | Ohno |
| 5,828,634 A | 10/1998 | Ohno et al. |
| 6,532,118 B1 | 3/2003 | Ohno |
| 2002/0034151 A1* | 3/2002 | Nakajima ............... 369/190 |
| 2002/0131347 A1* | 9/2002 | Raaymakers ............ 369/44.32 |
| 2003/0112726 A1 | 6/2003 | Ohno |
| 2003/0123161 A1 | 7/2003 | Ohno |

FOREIGN PATENT DOCUMENTS

JP    2000-339727    12/2000

* cited by examiner

Primary Examiner—Muhammad Edun
(74) Attorney, Agent, or Firm—Dickstein Shapiro LLP

(57) ABSTRACT

An optical disk device and a tilt correction method capable of high precision tilt correction with a smaller number of measurement positions are provided. Prior to data recording and reproduction, a number of measurement positions are set in the radial direction on an optical disk with intervals between two adjacent measurement positions shorter and shorter from the inner region to the peripheral region of the optical disk. The tilt at each of the measurement positions is measured, and the resulting tilt data are stored in a memory. The tilt data are used for making tilt corrections when recording or reproducing data on the optical disk.

7 Claims, 3 Drawing Sheets

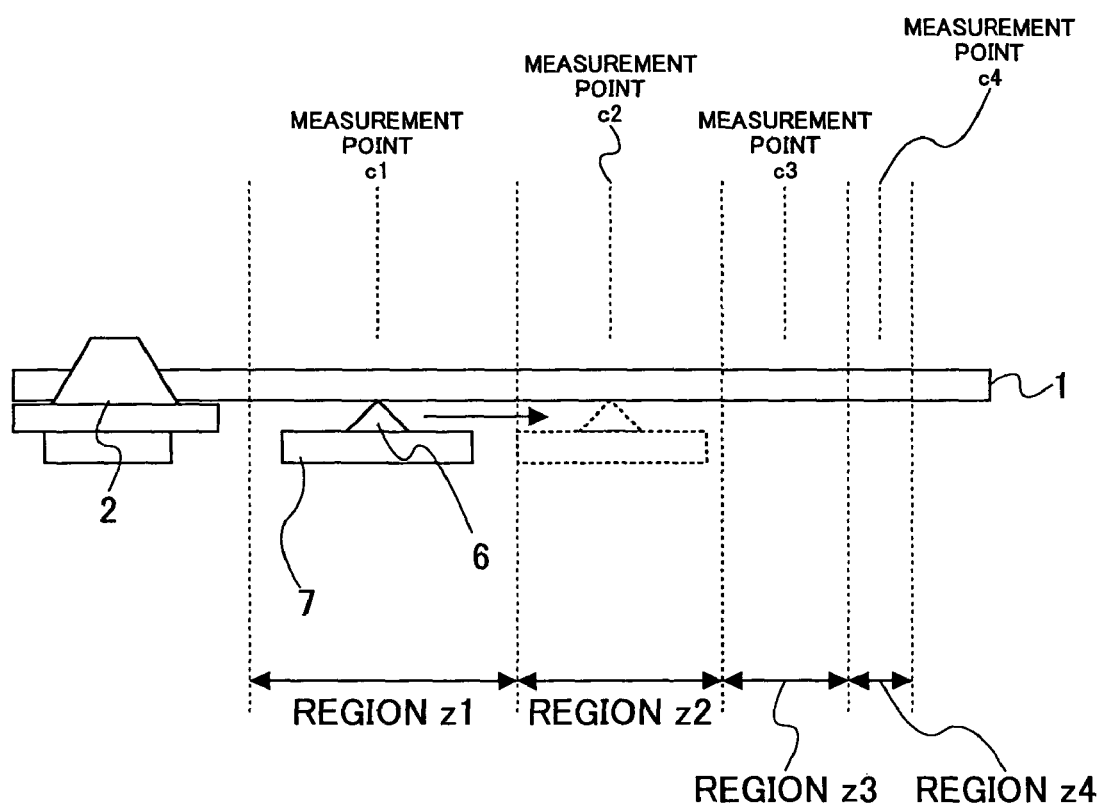

1

OPTICAL DISK DEVICE AND TILT CORRECTION METHOD

BACKGROUND OF THE INVENTION

1. Field of the Invention

The present invention relates to an optical disk device and a tilt correction method able to correct an incident angle of a laser beam so that the laser beam perpendicularly irradiates the surface of an optical disk.

2. Description of the Related Art

Optical disks, such as CD-ROMs, CD-Rs, and CD-RWs, are widely used. Particularly, in recent years and continuing, DVD type optical disks show up in greater numbers, and have higher track density and thus higher capacity than the above CD type optical disks. The reproduction-only DVD has become wide-spread, and the recordable DVD is being brought into practical use.

To record or reproduce data on an optical disk, an object lens is provided to condense a laser beam to form a small light spot on a track of the optical disk. If the optical axis of the object lens tilts relative to the optical disk, optical aberrations arise at the light spot, and this may present obstacles to data recording and reproduction. Below, the angle between the optical axis of the object lens and the normal line to a recording surface of the optical disk is called as "tilt of the optical system" or just "tilt".

Along with the higher and higher density of the above optical disks, there appear more and more apparatuses equipped with mechanisms for correcting the tilt that causes or increases the optical aberrations.

In the related art, a tilt correction device has been proposed, which includes a light emission element using LEDs (light emission diode), a tilt sensor formed by a two-division light detector for detecting the light emitted from the light emission element and reflected at the optical disk, and a device for tilting an object lens or an optical pick-up based on the output of the tilt sensor.

In the above tilt correction device, the arrangement of the tilt sensor is adjusted so that the two parts of the light detector in the tilt sensor yield the same outputs when detecting an optical disk originally installed, that is, an optical disk free from tilt. The light emitted from the light emission element is reflected by the optical disk, enters into the tilt sensor, and forms a light spot on the tilt sensor. By extracting a differential signal with the two-division detector in the tilt sensor, tilt can be detected.

In addition to the above method, there are other methods for detecting tilt. For example, a tilt correction value causing the RF signal and the TE (tracking error) signal to become the maximum can be extracted as tilt.

Another method for correcting tilt involves measuring in advance the tilt at a number of positions on the optical disk, and making tilt corrections based on the measured data. Another method involves measuring the tilt of the optical disk continuously and performing tilt servo.

Such a technique is disclosed in Japanese Patent Application Laid Open No. 2000-339727, which proposes an optical disk device to measure tilt at a number of positions in the radial direction of the optical disk and store the measured tilt data in advance, and correct the tilt based on the stored tilt data.

However, in the method of measuring in advance tilt data, which cause the RF signal and the TE signal to become the maximum, at a number of positions, and making tilt corrections based on the measured tilt data, because the magnitude of the tilt and its variation are small in the inner region of the optical disk, and large in the peripheral region of the optical disk, complicated calculations and tilt data of many positions are needed for interpolation to correct tilt between the two regions.

SUMMARY OF THE INVENTION

Accordingly, it is a general object of the present invention to solve the above problem of the related Art.

A specific object of the present invention is to provide an optical disk and a tilt correction method capable of high precision tilt correction with a smaller number of measurement positions.

To attain the above objects, according to a first aspect of the present invention, there is provided an optical disk device comprising an optical pickup that irradiates a laser beam onto a rotating optical disk, a tilt measurement unit configured to measure a tilt of the optical pickup relative to the optical disk at a preset measurement position, and a tilt correction unit configured to correct the tilt at the preset measurement position using tilt data measured at the preset measurement position, wherein the optical pickup is moved and set at a plurality of the preset measurement positions in a radial direction on the optical disk, and the tilt measurement unit measures the tilt at each of the preset measurement positions, intervals between adjacent two of the preset measurement positions being set shorter and shorter from an inner region to a peripheral region of the optical disk.

According to the above aspect of the present invention, by setting a smaller number of measurement positions in the inner region where the change of tilt is small, and a larger number of measurement positions in the peripheral region where the change of tilt is large, as mentioned above or illustrated in FIG. 2, it is possible to make more precise tilt corrections. In addition, although the number of measurement positions increases in the peripheral region, because the number of measurement positions decreases in the inner region, it is possible to prevent increasing of the total number of the preset measurement positions for achieving more precise tilt correction.

Preferably, the tilt data measured at one of the preset measurement positions is used in common for the tilt correction throughout a predetermined region including the one of the preset measurement positions.

According to the above aspect of the present invention, the tilt data measured at one preset measurement positions is utilized in common for the tilt correction in a predetermined region surrounding the preset measurement position, thus, it is not necessary to make calculations to determine the correction values between two adjacent measurement positions. Therefore, it is possible to make tilt correction with a smaller number of measurement positions and without complicated calculations, and make tilt correction control simple.

Preferably, the optical disk device further comprises a calculation unit to calculate a tilt value at a position between adjacent two of the preset measurement positions using the measured tilt data at the two adjacent preset measurement positions, the tilt correction unit correcting the tilt at the position using the calculated tilt value, wherein in an inner region on the optical disk on the inner side of the innermost preset measurement position, the calculation unit assigns the calculated tilt value to be equal to the tilt data measured at the innermost preset measurement position, and in a peripheral region on the optical disk on the outer side of the outermost preset measurement position, the calculation unit assigns the calculated tilt value to be equal to the tilt data measured at the outermost preset measurement position.

Although there are not adjacent preset measurement positions on the inner side of the innermost preset measurement position and outer side of the outermost preset measurement position, and interpolation using two preset measurement positions is impossible there, according to the above aspect of the present invention, tilt correction values are available even in regions on the inner side of the innermost preset measurement position and on the outer side of the outermost preset measurement position, and tilt corrections are possible in these regions.

Preferably, in the optical disk device, when an intended location of one of the preset measurement positions is between a recorded region and an unrecorded region on the optical disk, the actual location of the one of the preset measurement positions is shifted by a predetermined distance in a radial direction on the optical disk relative to the intended location of the one of the preset measurement positions.

Since the reflectivity in the recorded region is smaller than that in the unrecorded region in general, when traversing from an unrecorded region to a recorded region, or from a recorded region to an unrecorded region, the strength of the reflected laser beam changes greatly, obstructing proper tilt detection. According to the above aspect of the present invention, by shifting the actual measurement position out of the boundary area between the recorded region and the unrecorded region, this problem can be prevented and proper tilt correction can be made.

To attain the above objects, according to a second aspect of the present invention, there is provided a tilt correction method for correcting the tilt of a normal to an optical disk relative to an optical axis of an optical pickup in an optical disk device wherein the optical pickup irradiates a laser beam onto the optical disk, comprising a first step of moving the optical pickup and setting the optical pickup at a plurality of preset measurement positions in a radial direction on the optical disk, intervals between adjacent two of the preset measurement positions being set shorter and shorter from an inner region to a peripheral region of the optical disk, a second step of measuring the tilt at each of the preset measurement positions, and a third step of correcting the tilt at each of the preset measurement positions using corresponding measured tilt data.

Preferably, the third step comprises a step of correcting the tilt in a region including one of the preset measurement positions using the tilt data measured at the one of the preset measurement positions.

Preferably, the tilt correction method further comprises, after the first step, a step of calculating a tilt value at a position between adjacent two of the preset measurement positions, and correcting the tilt at the position using the calculated tilt value, wherein the third step comprises a step of assigning the calculated tilt value in an inner region on the inner side of the innermost preset measurement position to be equal to the tilt data measured at the innermost preset measurement position, and assigning the calculated tilt value in a peripheral region on the outer side of the outermost preset measurement position to be equal to the tilt data measured at the outermost preset measurement position.

These and other objects, features, and advantages of the present invention will become more apparent from the following detailed description of preferred embodiments given with reference to the accompanying drawings.

BRIEF DESCRIPTION OF THE DRAWINGS

FIG. 5 is a view showing a tilt correction method according to a second embodiment of the present invention.

DESCRIPTION OF THE PREFERRED EMBODIMENTS

Below, preferred embodiments of the present invention are explained with reference to the accompanying drawings.

Figure 1:
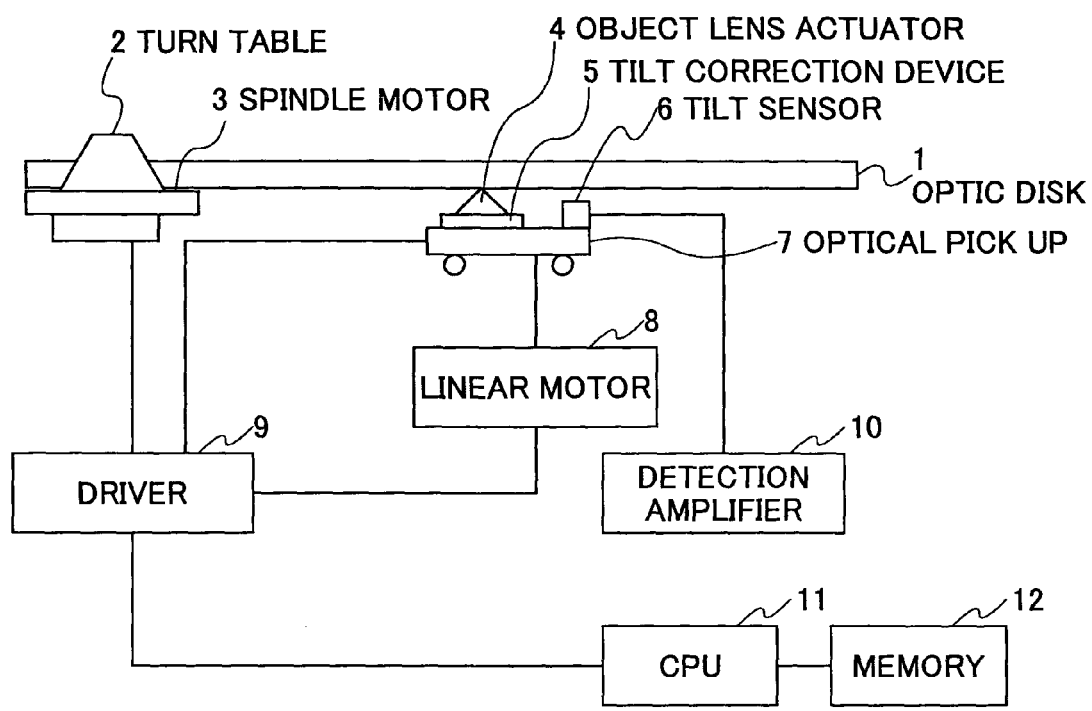
FIG. 1 is a block diagram showing a schematic configuration of an optical disk device according to a first embodiment of the present invention.

FIG. 1 is a block diagram showing a schematic configuration of an optical disk device according to a first embodiment of the present invention.

The optical disk device shown in FIG. 1 includes an optical disk 1, a turnable table 2, and a spindle motor 3. The turnable table 2 is attached to the spindle motor 3, and the optical disk 1 on the turnable table 2 is rotated by the spindle motor 3.

The optical disk device further comprises an optical pickup 7 including an object lens actuator 4, a tilt correction device 5, and a tilt sensor 6. The object lens actuator 4 is attached to the optical pickup 7 with the tilt correction device 5 in between.

In addition, the optical disk device comprises a linear motor 8 including a step motor for moving the optical pickup 7 in the radial direction, a driver circuit 9 for driving the spindle motor 3, the tilt correction device 5, and the linear motor 8, a detection amplifier 10, a CPU 11, and a memory 12.

The optical pickup 7 is mounted on a driving unit driven by the linear motor 8. Positions along the radial direction of the optical pickup 7 can be determined by counting the number of driving pulses from the linear motor 8 while the optical disk 1 is moved from an inner reference position in the radial direction by the linear motor 8.

The tilt correction device 5 mechanically swings the object lens actuator 4 to tilt the laser beam from the optical pickup 7 in the radial direction (in a plane containing the axis of rotation) of the optical disk, and makes adjustments by controlling the amount of the swinging motion of the object lens actuator 4 so that the laser beam from the optical pickup 7 perpendicularly irradiates the surface of the optical disk 1.

The amount of the swinging motion of the object lens actuator 4 is calculated by the CPU 11 based on the detection signal from the tilt sensor 6, and the tilt correction device 5 is driven by the driver circuit 9 based on the signal from the CPU 11.

The tilt sensor 6 includes a light emission element and a two-division light detector. The light emission element emits a laser beam onto the optical disk 1, which is the object to be detected, and the reflected laser beam is detected by the two-division light detector. If the optical disk 1 is not tilted, the light spot of the reflected laser beam is on the division line of the two-division light detector. However, if the optical disk 1 is tilted, the light spot of the reflected laser beam deviates from the division line of the light detector. Therefore, by comparing the amount of light received by the two parts of the light detector, a signal proportional to the amount of tilt of the optical disk 1 can be obtained. Further, two output signals from the two-division light detector are amplified by the detection amplifier 10, and the difference of the two signals is sent to the CPU 11 as a tilt signal.

As described above, there are a tilt correction method of measuring in advance the tilt of a number of preset positions, storing the measured tilt data in the memory 12, and making tilt corrections based on the measured data; and another tilt correction method of measuring the tilt of the optical disk continuously using the tilt sensor 6 and performing tilt servo. The present embodiment involves the former method.

Figure 2:
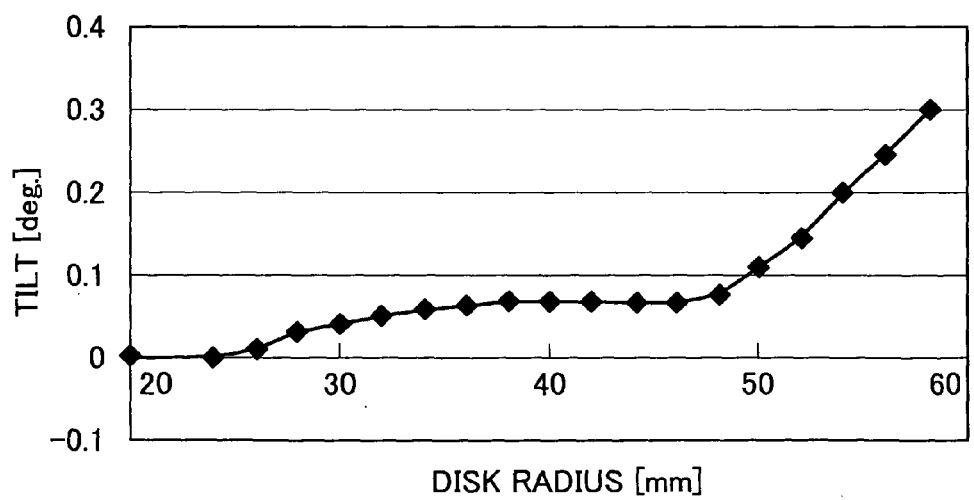
FIG. 2 is a graph showing a warp of the optical disk.

FIG. 2 is a graph showing a warp of the optical disk.

Generally, an optical disk is more warped in the peripheral region than in the inner region, and therefore the amount of tilt is larger in the peripheral region than in the inner region.

Figure 3:
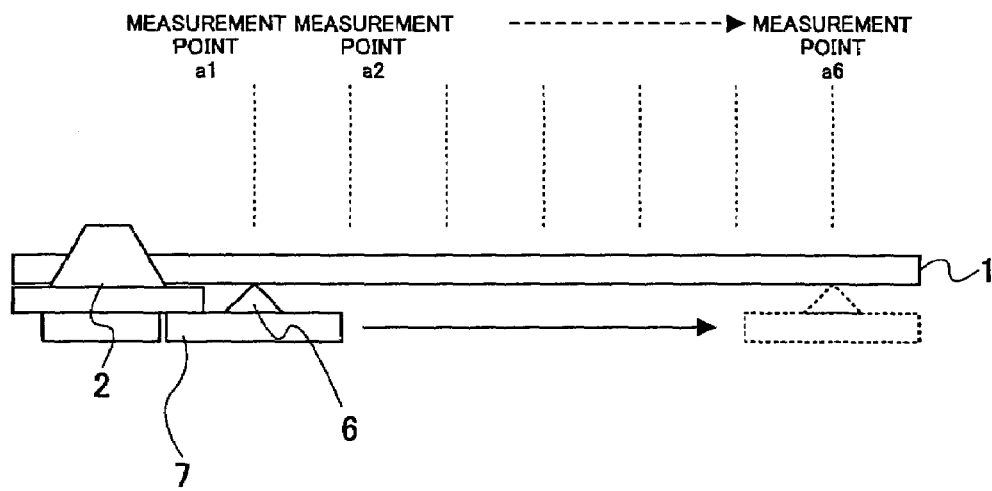
FIG. 3 is a view showing an example of a conventional tilt correction method.

FIG. 3 is a view showing an example of a correction method of the related art (Note: This seems to be related art instead of the present invention.).

The tilt correction of an optical disk having the warp illustrated in FIG. 2 may be performed as shown in FIG. 3. That is, first, move the optical pickup 7 from the inner region to the peripheral region of the optical disk 1 at regular intervals, next measure the tilt t1 through t6 of the optical disk 1 at measurement positions a1 through a6 in advance, and then store the measured tilt data t1 through t6 in memory 12. With these measured tilt data, the shape of the optical disk 1 can be determined. The tilt correction value at a position between two adjacent measurement positions may be calculated approximately by interpolation. For example, the tilt correction value for a position between the measurement point a1 and the measurement point a2 can be calculated by interpolation from the tilt data t1 and t2.

Then, the position of the optical pickup 7 when recording or reproducing data is monitored, and each time the optical pickup 7 moves a predetermined distance, the tilt correction value corresponding to the present position of the optical pickup 7 is read out from the memory 12 to the CPU 11 and is used for tilt control.

In the method shown in FIG. 3, however, because the variation of the amount of the tilt is larger in the peripheral region than in the inner region of the optical disk 1, the difference between the actual amount of tilt and the tilt correction value obtained as shown above becomes large in the peripheral region. In order to precisely calculate the tilt correction value between two measurement points, the calculations become quite complicated. If more than two points are used for interpolation calculations, the interpolated tilt correction value may be calculated easily by the first order approximation, but in this case, the time required for mounting the optical disk becomes longer, and this is inconvenient to users.

First Embodiment

Figure 4:
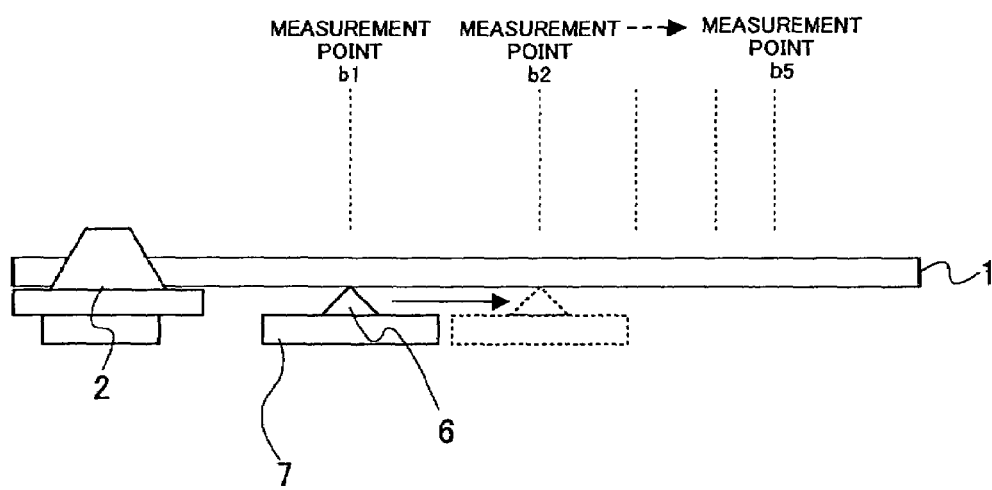
FIG. 4 is a view showing a tilt correction method according to a first embodiment of the present invention.

FIG. 4 is a view showing a tilt correction method according to the first embodiment of the present invention.

As illustrated in FIG. 4, when the optical disk 1 is mounted in the optical disk device, the optical pickup 7 is moved to a preset measurement position b1 before recording or reproducing data on the optical disk 1, and the tilt (t1) at b1 is measured by the tilt sensor 6, and is stored in the memory 12. Next, the optical pickup 7 is moved to a preset measurement position b2 to measure the tilt (t2) at b2. This tilt measurement is repeated, and tilt data for all preset measurement positions b1 through b5 are obtained. Tilt correction values at positions between two adjacent preset measurement positions are calculated by the first order approximation. With these tilt correction values and tilt data, the shape of the optical disk 1 can be determined.

In this embodiment, it is set that the interval between two adjacent preset measurement points becomes shorter and shorter from the inner region to the peripheral region of the optical disk 1.

As for the interpolation, for example, the correction value T at a position X between the preset measurement positions b1 and b2, is calculated by the following formula (1).

$$T = T1 + (X-X1)(T2-T1)/(X2-X1) \quad (1)$$

where, X1 and X2 represent preset measurement positions b1 and b2, and T1 and T2 are the measured tilt data at b1 and b2, respectively.

Therefore, between the preset measurement positions b1 and b2, tilt control is performed based on the tilt correction value obtained by the formula (1).

Here, because at the innermost preset measurement position b1, there is not an adjacent preset measurement position on the inner side, interpolation using two preset measurement positions is impossible. Similarly, at the outermost preset measurement position b5, because there is not an adjacent preset measurement position on the outer side, interpolation using two preset measurement positions is impossible here, as well. In other words, because the tilt sensor 6 is arranged on the straight line in the radial direction on the optical disk 1 where the object lens is arranged, there exists a recording region on the inner side of the innermost preset measurement position b1, and a recording region on the outer side of the outermost preset measurement position b5. When the object lens of the optical pickup 7 is in these regions, the corresponding tilt correction values cannot be calculated. As an approximation, usually on the inner side of the innermost preset measurement position b1, the tilt at the preset measurement position b1 is used for tilt control, and on the outer side of the outermost preset measurement position b5, the tilt at the preset measurement position b5 is used for tilt control.

Furthermore, if a recorded region and an unrecorded region exist on the optical disk, for example a rewritable optical disk, the reflectivity in the recorded region is less than that in the unrecorded region. Therefore, when traversing from an unrecorded region to a recorded region, or from a recorded region to an unrecorded region, the strength of the laser beam entering the tilt sensor 6 and the amplitudes of signals output from the tilt sensor 6 change greatly. As a result, the detected amount of tilt involves uncertainties, and this may prevent a precise tilt correction.

In order to avoid this problem, the addresses of the regions recorded with data may be obtained from the TOC information of the optical disk 1, whereby the recorded region and the unrecorded region may be identified. In the boundary area between a recorded region and an unrecorded region, if the boundary area is close to an intended preset measurement position, or an intended preset measurement position is included in this boundary area, the optical pickup 7 is moved to shift the actual location of the preset measurement position by a certain distance.

According to the first embodiment, by setting a smaller number of measurement positions in the inner region where the change of the tilt is small, and a larger number of measurement positions in the peripheral region where the change of the tilt is large, it is possible to make precise tilt corrections with a smaller number of measurement positions without complicated calculations.

Second Embodiment

FIG. 5 is a view showing a correction method according to a second embodiment of the present invention.

In the first embodiment, the intervals between two adjacent preset measurement positions in the radial direction are set to be shorter and shorter from the inner region to the peripheral region of the optical disk 1. Further, the surface of the optical disk 1 is divided into regions in conjunction with the varying intervals, and tilt correction is performed in each region based on the tilt detection results therein.

In the present embodiment, for example, the regions between two adjacent preset measurement positions b1 and b2, b2 and b3, b3 and b4, and b4 and b5 are denoted as z1, z2, z3 and z4, respectively, and the mid-points of the regions z1, z2, z3 and z4 are denoted as c1, c2, c3, and c4, respectively. The tilt data at the mid-points c1, c2, c3, and c4 are measured beforehand and stored in the memory 12.

And then, for example, when making tilt correction in the region z1, tilt control is performed using the tilt data obtained at the mid-point c1. Similarly, in regions z2, z3, and z4, tilt control is performed using the tilt data obtained at the midpoints c2, c3, and c4, respectively. Consequently, tilt correction may be made without calculations.

When making the tilt corrections, it is necessary to ascertain which region the optical pickup 7 is in. In the present embodiment, the measurement mid-points c1, c2, c3, and c4 and the regions z1, z2, z3, and z4 have their own addresses, and when recording and reproducing data, these addresses are compared with those obtained from the optical disk 1 to identify where the optical pickup 7 is.

According to the second embodiment, regions are defined, each of which has a measurement mid-point as the center thereof. The sizes of these regions, the same as the intervals between two adjacent preset measurement positions, become smaller and smaller from the inner region to the peripheral region. In each of these regions, the same tilt data obtained at the same measurement mid-point is used, and therefore, it is not necessary to make calculations by using the first order approximation between two adjacent preset measurement positions.

While the present invention is described with reference to specific embodiments chosen for purpose of illustration, it should be apparent that the invention is not limited to these embodiments, but numerous modifications could be made thereto by those skilled in the art without departing from the basic concept and scope of the invention.

For example, it is described that the tilt sensor 6 is used to detect tilt in the above embodiments, but the present invention is not limited to this. The tilt measurement may also be made using the tracking error (TE) signal and the RF signal, instead of the tilt sensor 6. In this case, since tilts at the innermost position and the outermost position can be measured, it becomes possible to obtain the tilts at all other positions in the radial direction of the optical disk 1 by calculations.

Summarizing the effect of the invention, according to the present invention, by setting a smaller number of measurement positions in the inner region where the change of the tilt is small, and a larger number of measurement positions in the peripheral region where the change of the tilt is large, it is possible to make more precise tilt corrections. In addition, although the number of measurement positions increases in the peripheral region, because the number of measurement positions decreases in the inner region, it is possible to prevent increasing of the total number of the preset measurement positions for achieving more precise tilt correction.

Further, because the tilt data measured at one preset measurement positions is utilized in common for the tilt correction in a predetermined region surrounding the preset measurement position, it is not necessary to make calculations to determine the correction values between two adjacent measurement positions, hence it is possible to make tilt correction with a smaller number of measurement positions and without complicated calculations, making tilt correction control simple.

Further, although interpolation using two adjacent preset measurement positions is impossible in regions on the inner side of the innermost preset measurement position and on the outer side of the outermost preset measurement position, because there are not adjacent preset measurement positions there, tilt correction values are available and tilt corrections are possible in these regions according to the present invention.

Although the optical properties of a recorded region and an unrecorded region are different, and strength of the reflected laser beam from there and amplitudes of the corresponding output signals change greatly, proper tilt correction can be made according to the present invention by shifting the actual measurement position out of the boundary area between the recorded region and the unrecorded region.

This patent application is based on Japanese Priority Patent Application No. 2002-253738 filed on Aug. 30, 2002, the entire contents of which are hereby incorporated by reference.

What is claimed is:

1. An optical disk device, comprising:
an optical pickup that irradiates a laser beam onto a rotating optical disk;
a tilt measurement unit configured to measure a tilt of the optical pickup relative to the optical disk at a preset measurement position; and
a tilt correction unit configured to perform correction at the preset measurement position using tilt data measured at the preset measurement position,
wherein:
the optical pickup is moved and set at a plurality of the preset measurement positions in a radial direction on the optical disk, and the tilt measurement unit measures the tilt at each of the preset measurement positions, intervals between adjacent two of the preset measurement positions being set shorter and shorter from an inner region to a peripheral region of the optical disk.

2. The optical disk device as claimed in claim 1, wherein the tilt data measured at one of the preset measurement positions is used in common for the tilt correction throughout a predetermined region including the one of the preset measurement positions.

3. The optical disk device as claimed in claim 1, further comprising a calculation unit configured to calculate a tilt value at a position between adjacent two of the preset measurement positions using the tilt data measured at the two adjacent preset measurement positions, said tilt correction unit correcting the tilt at the position using the calculated tilt value,
wherein:
in an inner region on the optical disk on the inner side of the innermost preset measurement position, the calculation unit assigns the calculated tilt value to be equal to the tilt data measured at the innermost preset measurement position; and
in a peripheral region on the optical disk on the outer side of the outermost preset measurement position, the calculation unit assigns the calculated tilt value to be equal to the tilt data measured at the outermost preset measurement position.

4. The optical disk device as claimed in claim 1, wherein when an intended location of one of the preset measurement positions is between a recorded region and an unrecorded region on the optical disk, the actual location of the one of the preset measurement positions is shifted by a predetermined distance in a radial direction on the optical disk relative to the intended location of the one of the preset measurement positions.

5. A tilt correction method for correcting a tilt of an optical disk relative to an optical pickup in an optical disk device wherein the optical pickup irradiates a laser beam onto the optical disk, comprising:
 a first step of moving the optical pickup and setting the optical pickup at a plurality of preset measurement positions in a radial direction on the optical disk, intervals between adjacent two of the preset measurement positions being set shorter and shorter from an inner region to a peripheral region of the optical disk;
 a second step of measuring the tilt at each of the preset measurement positions; and
 a third step of performing tilt correction at each of the preset measurement positions using corresponding measured tilt data.

6. The tilt correction method as claimed in claim 5, the third step comprising a step of correcting the tilt throughout a predetermined region including one of the preset measurement positions using the tilt data measured at the one of the measurement positions.

7. The tilt correction method as claimed in claim 5, further comprising, after the first step, a step of calculating a tilt value at a position between the adjacent two of the preset measurement positions, and correcting the tilt at the position using the calculated tilt value, wherein:

the third step comprises a step of:

assigning the calculated tilt value in an inner region on the inner side of the innermost preset measurement position to be equal to the tilt data measured at the innermost preset measurement position; and assigning the calculated tilt value in a peripheral region on the outer side of the outermost preset measurement position to be equal to the tilt data measured at the outermost preset measurement position.

* * * * *